3,381,010
DEXTROMETHORPHAN HYDROXYBENZOYL
BENZOATE
Henry C. Caldwell, Ambler, and William E. Smith, Fort Washington, Pa., assignors to Smith Kline & French Laboratories, Philadelphia, Pa., a corporation of Pennsylvania
No Drawing. Filed Oct. 5, 1964, Ser. No. 401,710
2 Claims. (Cl. 260—285)

ABSTRACT OF THE DISCLOSURE d - 3 - methoxy-N-methylmorphinan o-(p-hydroxybenzoyl)benzoate salt and liquid sustained release antitussive preparations employing said salts. The salt is prepared by reacting the base with o-(p-hydroxybenzoyl)benzoic acid in an inert organic solvent and precipitating the salt from the solution.

This invention relates to a novel substituted dextromethorphan derivative having valuable therapeutic activity. More specifically this invention relates to d-3-methoxy - N - methylmorphinan o-(p-hydroxybenzoyl) benzoate having the following structural formula:

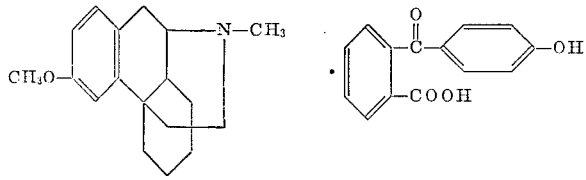

The novel compound of this invention has utility as a new and improved antitussive agent. Dextromethorphan salts such as the hydrobromide have been used in pharmaceutical preparations in place of codeine because they are known to possess the antitussive properties of codeine without the addictive, analgesic and central depressant features. However, these previously known derivatives of dextromethorphan when used in oral cough preparations, such as syrups or suspensions, were absorbed too rapidly and made the adminisitration difficult and unpleasant. Such side effects as bitter taste and numbing of the tongue and surrounding mucous membrane were prevalent. These side effects made the oral pharmaceutical cough preparation very unpalatable.

Further, the relatively high solubility of the previously known derivatives made it difficult if not impossible to prepare a liquid sustained release cough preparation. These liquid sustained release preparations are generally made by either coating or embedding the dextromethorphan in a sustained release material and then suspending these coated particles in finely powdered form in an aqueous vehicle. If the medicament is highly soluble, such as the previously known derivatives, it will leach rapidly through the coating material into the aqueous vehicle and thus release an initial dose which is too high.

The dextromethorphan derivative of this invention is much less soluble and is therefore absorbed much slower and provides for a therapeutic oral cough preparation which is free from the above mentioned side effects. Equieffective doses of the novel dextromethorphan hydroxybenzoyl benzoate of this invention provides for an oral cough preparation having slower absorption and being practically free of any bitter taste and numbing effect.

Most important, the hydroxybenzoyl benzoate of this invention because of its very low solubility now provides a dextromethorphan derivative which can be employed in liquid sustained release form. This novel derivative does not penetrate the coating material rapidly when placed in a nontoxic pharmaceutical liquid vehicle and therefore the problem of having too much of the dextromethorphan present initially for the immediate dose is eliminated.

Advantageously the dextromethorphan hydroxybenzoyl benzoate will be present as the hydrate salt, preferably the monohydrate, in the sustained release liquid product because it forms unusually stable sustained release products compared with other salts or even the unhydrated hydroxybenzoyl benzoate salt.

The d - 3-methoxy-N-methylmorphinan o-(p-hydroxybenzoyl)benzoate of this invention is prepared by reacting the d-3-methoxy-N-methylmorphinan base with o-(p-hydroxybenzoyl)benzoic acid in an inert organic solvent such as chloroform and precipitating the salt from the solution. The hydrate salt is then prepared by recrystallizing the anhydrous form from aqueous dimethylformamide.

The novel dextromethorphan derivative of this invention is advantageously employed in combination with either a liquid or solid nontoxic pharmaceutical carrier. Preferably a liquid vehicle is employed in which the compound which has been previously coated with a sustained release material is suspended.

The coating of the dextromethorphan hydroxybenzoyl benzoate can be accomplished by several methods all well known to the art. For example, the finely powdered dextromethorphan can be suspended in a gas such as air in an upstanding zone and then sprayed with liquefied sustained release material while suspended. This method of coating solid particles is fully detailed in U.S. Patent No. 2,986,475.

Further, the compound can be mixed with the sustained release material by heating the material to a molten state and then admixing the medicament. The molten mixture can then be either spray crystallized or solidified and ground to the desired particle size. Still further, the novel dextromethorphan derivative of this invention can be coated by liquefying the sustained release material in a suitable organic solvent, such as, for example, chloroform, mixing the dextromethorphan with the liquefied material to form a slurry and spray drying the slurry to form solid particles of the medicament coated with the sustained release material. These methods of spray drying and spray crystallizing are fully disclosed in U.S. Patent No. 2,805,977. The spray drying or crystallizing can be carried out in any apparatus conventionally used for these purposes and which are well known to the art.

The dextromethorphan hydroxybenzoyl benzoate which has been coated with sustained release material by any of the above methods or any other equivalent method will have a particle size of from about 10 to about 200 microns. These particles are then suspended in a nontoxic pharmaceutically acceptable aqueous vehicle to provide for a sustained release preparation in liquid form.

In addition to water the aqueous vehicle may include a suspending agent such as, for example, tragacanth, acacia, carboxymethyl cellulose, methyl cellulose, agar or pectin; preservatives such as, for example, methyl or propyl paraben and sorbic acid; sweetening agents, such as, for example, sodium saccharin or sodium sucaryl; stabilizing agents, such as, for example, propylene glycol or sorbitol and flavoring agents such as, for example, the essential oils and the like and surface active agents, such as, for example, any known nontoxic anionic agent such as sodium lauryl sulfate, cationic agent such as benzalkonium chloride or non-ionic agent such as polyoxyethylene sorbitan monooleate.

In accordance with this invention the sustained release material used to coat the dextromethorphan hydroxybenzoyl benzoate particles is a substantially water insoluble material resistant to disintegration in the gastrointestinal tract and providing for a gradual release of the medicament in said tract. The time delay material may be, for example, a wax, a fatty acid, alcohol or ester, metallic salts of fatty acids, or a wax-like water insoluble polymer such as, for example, polyethylene or polypropylene, alone or an admixture thereof. Advantageously the time delay material is a lipid material.

The wax may be paraffin wax; a petrolatum wax; a mineral wax such as ozokerite, ceresin, utah wax or montan wax; a vegetable wax such as, for example, carnauba wax, Japan wax, bayberry wax, flax wax; an animal wax such as, for example, spermaceti; or an insect wax such as beeswax, Chinese wax or shellac wax.

Additionally, the wax material may be an ester of a fatty acid having from 12 to 31 carbon atoms and a fatty alcohol having from 12 to 31 carbon atoms, the ester having a carbon atom content of from 24 to 62, or a mixture thereof. Exemplary are myricyl palmitate, ceryl palmitate, ceryl cerotate, myricyl mellissate, stearyl palmitate, stearyl myristate, lauryl laurate.

The fatty acid may have from 10 to 22 carbon atoms and may be, for example, decenoic, docosanoic, stearic, palmitic, lauric or myristic acid.

The fatty alcohols may have from 10 to 22 carbon atoms and may be, for example, lauryl alcohol, cetyl, stearyl, myristyl, myricyl, arachyl, carnubyl or ceryl alcohol.

The esters may be mono-, di- or triglyceryl esters formed from fatty acids having from 10 to 22 carbon atoms, such as, for example, glyceryl distearate, glyceryl tristearate, glyceryl monostearate, glyceryl dipalmitate, glyceryl tripalmitate, glyceryl monopalmitate, glyceryl dilaurate, glyceryl trilaurate, glyceryl monolaurate, glyceryl didocosanoate, glyceryl tridocosanoate, glyceryl monodocosanoate, glyceryl monocaprate, glyceryl dicaprate, glyceryl tricaprate, glyceryl monomyristate, glyceryl dimyristate, glyceryl trimyristate, glyceryl monodecenoate, glyceryl didecenoate, or glyceryl tridecenoate, hydrogenated castor oil, hydrogenated peanut oil and hydrogenated coconut oil.

Exemplary of metallic salts of fatty acids are the aluminum or maganesium salts of fatty acids ranging from 8 to 18 carbon atoms such as aluminum stearate and magnesium palmitate.

The preferred sustained release materials are hydrogenated castor oil, glyceryl tristearate, 12-hydroxystearic acid, 12-hydroxystearyl alcohol, glyceryl distearate and microcrystalline wax.

It is to be understood that mixtures of the above sustained release materials can be employed and additives to yield more uniform disintegration can be employed such as, for example, ethyl cellulose.

It will be apparent to those skilled in the pharmaceutical art that methods and material equivalent to those described herebefore such as, for example, using fluid bed coating methods could be used. The following examples are not limiting but are used to make obvious to one skilled in the art the full practice of the method of this invention.

Example 1

To a solution of 54.28 g. of d-methorphan in one liter of chloroform is added a solution of 48.4 g. of o-(p-hydroxybenzoyl) benzoic acid in chloroform at 70° C. The salt is precipitated from the hot solution by the addition of ethyl acetate. After cooling the salt is collected, washed with ethyl acetate and dried to yield d-3-methoxy-N-methylmorphinan o-(p-hydroxybenzoyl)benzoate as a white crystalline powder melting at about 205° C. and having a solubility of about 0.4 mg./ml. in water.

The d-3-methoxy-N-methylmorphinan o-(p-hydroxybenzoyl)benzoate is recrystallized from aqueous dimethylformamide to yield the hydrate salt having a solubility of 0.9 mg./ml.

Example 2

| Ingredients: | Amount |
|---|---|
| Dextromethorphan hydroxybenzoyl benzoate monohydrate _____gm__ | 17.04 |
| Glyceryl tristearate _____gm__ | 17.04 |
| Carbon tetrachloride _____ml__ | 110.00 |

The carbon tetrachloride is warmed to 55–60° C. and the glyceryl tristearate is dissolved in the warm solvent. The dextromethorphan hydroxybenzoyl benzoate is then added and suspended in the solution. The suspension is then spray dried using an inlet temperature of 90° C. and an outlet temperature of 40° C. The resulting coated powder having an average particle size of from about 10 to about 200 microns is then suspended in the following aqueous vehicle.

| Tragacanth, USP _____gm__ | 10.00 |
|---|---|
| Methylparaben, USP _____gm__ | 1.20 |
| Propylparaben, USP _____gm__ | 0.20 |
| Saccharin sodium, USP _____gm__ | 0.30 |
| Sucaryl sodium, USP _____gm__ | 3.00 |
| Sorbic acid _____gm__ | 0.80 |
| Sorbitol solution, USP _____ml__ | 250.00 |
| Methyl cellulose, 15 cps. _____gm__ | 1.00 |
| Imitation black currant _____ml__ | 2.00 |
| Distilled water, q.s. _____ml__ | 1000.00 |

The parabens, saccharin sodium, sucaryl sodium and sorbic acid are dissolved in a portion of the distilled water which has been heated to 85° C. The tragacanth is then added to this solution and dispersed uniformly. The dispersion is again heated, cooled and the sorbitol solution, a solution of the methyl cellulose in water and the imitation black currant are then added with mixing to form the vehicle.

The coated dextromethorphan is then added to the above vehicle and mixed until the particles are thoroughly wetted and uniformly dispersed.

What is claimed is:
1. d-3-methoxy - N - methylmorphinan o-(p-hydroxybenzoyl)benzoate hydrate.
2. d-3-methoxy-N-methylmorphinan o-(p - hydroxybenzoyl)benzoate.

References Cited

UNITED STATES PATENTS

| 3,140,233 | 7/1964 | Rieckmann | 167—82 |
| 3,166,559 | 1/1965 | Sawa et al. | 260—285 |
| 3,248,290 | 4/1966 | Zentner | 260—285 |

FOREIGN PATENTS

| 933,141 | 8/1963 | Great Britain. |

OTHER REFERENCES

Shionogi, Chemical Abstracts, vol. 54, col. 1482e (Abstracting Japanese Patent 6148, July 1959).

NICHOLAS S. RIZZO, Primary Examiner.

D. G. DAUS, Assistant Examiner.